(12) United States Patent
Rantanen et al.

(10) Patent No.: US 9,473,345 B2
(45) Date of Patent: Oct. 18, 2016

(54) NETWORK SEARCH, SELECTION AND ENTRY IN WIMAX

(75) Inventors: Tommi Olavi Rantanen, Tampere (FI); Jukka Sakari Ala-Vannesluoma, Tampere (FI); Jani Petteri Hirsimaki, Tampere (FI); Ilkka Antero Oksanen, Tampere (FI); Mikko Jarkko Tasa, Tampere (FI)

(73) Assignee: Nokia Technologies Oy, Espoo (FI)

(*) Notice: Subject to any disclaimer, the term of this patent is extended or adjusted under 35 U.S.C. 154(b) by 1145 days.

(21) Appl. No.: 12/524,056

(22) PCT Filed: Jan. 22, 2008

(86) PCT No.: PCT/EP2008/050724
§ 371 (c)(1),
(2), (4) Date: Oct. 2, 2009

(87) PCT Pub. No.: WO2008/090163
PCT Pub. Date: Jul. 31, 2008

(65) Prior Publication Data
US 2012/0263073 A1  Oct. 18, 2012

Related U.S. Application Data

(60) Provisional application No. 60/881,827, filed on Jan. 23, 2007.

(51) Int. Cl.
*H04W 80/04* (2009.01)
*H04L 29/12* (2006.01)
*H04L 12/54* (2013.01)
(Continued)

(52) U.S. Cl.
CPC ..... *H04L 29/12594* (2013.01); *H04L 12/5692* (2013.01); *H04L 61/3075* (2013.01); *H04W 4/18* (2013.01); *H04W 8/26* (2013.01)

(58) Field of Classification Search
CPC ... H04W 80/04; H04W 88/06; H04W 36/18; H04W 84/12
See application file for complete search history.

(56) References Cited

U.S. PATENT DOCUMENTS

| 5,301,359 | A | 4/1994 | Van den Heuvel et al. |
| 6,509,913 | B2 * | 1/2003 | Martin et al. ................. 715/762 |
| 7,853,247 | B2 * | 12/2010 | Dillinger et al. ............. 455/418 |

(Continued)

FOREIGN PATENT DOCUMENTS

| GB | 2294844 A | 5/1996 |
| WO | 9214308 A | 8/1992 |

(Continued)

OTHER PUBLICATIONS

"International Search Report and The Written Opinion of The International Searching Authority", received in corresponding PCT Application No. PCT/EP2008/0500724, Dated May 8, 2008, 12 pages.

(Continued)

*Primary Examiner* — Andrew Lee
(74) *Attorney, Agent, or Firm* — Mintz Levin Cohn Ferris Glovsky and Popeo, P.C.

(57) ABSTRACT

Displayable names corresponding to identities of networks which provide service for subscriber stations are obtained, the identities of the networks and the corresponding displayable names are processed into processed information, and the processed information is transmitted.

24 Claims, 8 Drawing Sheets

(51) Int. Cl.
*H04W 4/18* (2009.01)
*H04W 8/26* (2009.01)

(56) References Cited

U.S. PATENT DOCUMENTS

| | | | |
|---|---|---|---|
| 7,912,453 B2* | 3/2011 | Coan et al. | 455/412.1 |
| 7,930,340 B2* | 4/2011 | Arunachalam | 709/203 |
| 2002/0077121 A1* | 6/2002 | Ketola | 455/456 |
| 2005/0289591 A1* | 12/2005 | Vermola et al. | 725/45 |
| 2006/0099963 A1* | 5/2006 | Stephens | 455/456.3 |
| 2006/0211448 A1* | 9/2006 | Reiss et al. | 455/553.1 |
| 2006/0236325 A1* | 10/2006 | Rao et al. | 719/315 |
| 2006/0276189 A1* | 12/2006 | Kiernan et al. | 455/436 |
| 2008/0133336 A1* | 6/2008 | Altman et al. | 705/10 |
| 2008/0165738 A1* | 7/2008 | Barber | 370/331 |
| 2009/0049526 A1* | 2/2009 | Zhang et al. | 726/4 |
| 2009/0070854 A1* | 3/2009 | Gu et al. | 726/1 |
| 2009/0300726 A1* | 12/2009 | Qian et al. | 726/4 |
| 2011/0047230 A1* | 2/2011 | McGee | 709/206 |
| 2011/0047603 A1* | 2/2011 | Gordon et al. | 726/5 |
| 2012/0220314 A1* | 8/2012 | Altman et al. | 455/456.3 |
| 2012/0263073 A1* | 10/2012 | Rantanen et al. | 370/254 |
| 2013/0040643 A1* | 2/2013 | Phillips et al. | 455/435.2 |

FOREIGN PATENT DOCUMENTS

| | | |
|---|---|---|
| WO | 03009614 A | 1/2003 |
| WO | 2004064437 A | 7/2004 |

OTHER PUBLICATIONS

Chatterjee, "Recommended OTA Provisioning Additions for Release 1.5 Network", WiMAX Forum Service Providers Working Group.
WiMAX Forum, "GRWG F2F Roaming Guideline Session Summary", 2005.

* cited by examiner

NETWORK SEARCH, SELECTION AND ENTRY IN WIMAX

RELATED APPLICATION

This application was originally filed as PCT Application No. PCT/EP2008/050724 filed Jan. 22, 2008 which claims priority to U.S. Provisional Application No. 60/881,827 filed Jan. 23, 2007.

FIELD AND BACKGROUND OF THE INVENTION

The present invention relates to mobile WiMAX (Worldwide Interoperability for Microwave Access) which is an emerging technology for enabling mobile wireless broadband connectivity. In particular, the invention relates to network search, selection and entry in WiMAX.

WiMAX system lends itself as a lightweight Internet access technology. It is built on top of 802.16 standard family MAC+PHY (Medium Access Control+Physical layer) standard from IEEE (certified by WiMAX). The system standard (higher layers and network) is standardized and certified by WiMAX Forum.

The WiMAX Forum is an industry-led, non-profit organization formed to develop technical specifications and promote and certify compatibility and interoperability of broadband wireless products using the IEEE 802.16 standard family. Based on requirements from the Forum's Service Provider WG (Working Group) (SPWG), the Network WG (NWG) is developing an end-to-end, all-IP system specification for WiMAX networks, supporting Stationary to Fully Mobile operation based on the IEEE 802.16 standard family. The work is organized as NWG's Stage 2 (architecture framework) and Stage 3 (detailed protocols and procedures) based on SPWG's Stage 1 (Requirements) document. The NWG specifications support standalone WiMAX network deployments as well as Interworking scenarios with incumbent networks such as 3GPP2 (Third Generation Partnership Project 2) networks.

A WiMAX network search by a subscriber station (SS) provides information about the available networks. According to this information, the SS is able to show to the user the networks that can be accessed with credentials stored into the SS.

SUMMARY OF THE INVENTION

The present invention is concerned with improving search for available WiMAX networks, selection of WiMAX network and entry to a selected WiMAX network. Moreover, the invention is concerned with a conversion of network service provider IDs into an understandable displayable name.

According to an aspect of the invention, displayable names corresponding to identities of networks are obtained which provide service for subscriber stations, the identities of the networks and the corresponding displayable names are processed into processed information, and said processed information is transmitted.

The obtaining may comprise mapping the identities to the displayable names.

The networks may comprise at least one of network service provider networks, connectivity service networks and network access provider networks.

For each network, network information comprising at least one of a character set, a realm of the identities, an operator logo, displayable name and an indication that the network information has been updated may be prepared as the processed information.

The processed information may be transmitted in at least one of a downlink channel descriptor message, a service identity information advertisement message and a basic capability response message.

The processed information may be prepared in a format of type length values.

The processed information may be prepared in a format of at least one of a network service provider type length value, a Verbose network service provider name list type length value, a network service provider indication type length value in downlink channel descriptor indicating that the network information has been updated, a visited network service provider realm type length value and a service identity information advertisement message pointer type length value.

The processed information may be transmitted to a subscriber station upon receipt of a request message from the subscriber station requesting the processed information.

The processed information may be transmitted to a subscriber station upon a change of the processed information.

It may be determined whether the identities of the networks and the corresponding displayable names have been updated, and information that existing identities of the networks and the corresponding displayable names have been updated may be transmitted according to the determination.

The obtaining may comprise retrieving the displayable names from pre-configuration information stored in an apparatus and/or receiving the displayable names from at least one of an access service network gateway, connectivity service network and network management system.

According to an aspect of the invention, information is received from an apparatus, the information comprising at least a list of identities of networks which provide service for subscriber stations and displayable names of the identities of the networks, and a network is selected out of the networks based on the list.

The information may comprise at least one of a character set, a realm of the identities, an operator logo and an indication that the network information has been updated.

A list of available networks may be prepared from the information and configuration information of the apparatus and a network may be selected out of the available networks.

An indication for connecting/entering the network selected may be prepared, and the indication may be transmitted.

A message requesting the information may be prepared, and the message may be transmitted to the apparatus.

The message may be a basic capability request message and the preparing may comprise preparing the request in a format of type length values.

At least one of a service information query type length value and a visited network service provider identifier type length value may be prepared and the request may be indicated therein.

According to an aspect of the invention, information about free and/or possible networks which provide service for subscriber stations is obtained, the information is processed, and the processed information is transmitted.

The obtaining may comprise retrieving the information from pre-configuration information stored in an apparatus and/or receiving the information from at least one of an access service network gateway, connectivity service network and network management system.

A list of free and/or possible networks may be prepared as the processed information and the processed information may be included in a message, and the message may be transmitted.

The message may comprise at least one of a service identity information advertisement message and a basic capability response message.

The message may be prepared in the format of a type length value.

The obtaining may comprise obtaining information about supported connections/relationships between networks.

Identities of the networks may be mapped to displayable names, and the displayable names may be transmitted as the processed information.

According to an aspect of the invention, information comprising a list of free and/or possible networks which provide service for an apparatus is received from another apparatus, a network is selected out of the free and/or possible networks based on the list and an indication for connecting/entering the network selected is prepared, and the indication is transmitted.

Found networks may be checked based on pre-configured information on free and possible networks, information included in the list may be processed, and the network may be selected based on the information.

The indication may comprise a network access identifier including at least one of a reserved realm, reserved username with network's realm and reserved decoration.

A message requesting the information from the another apparatus may be prepared, and the message may be transmitted to the another apparatus.

The message may be a basic capability request message and the preparing may comprise preparing the message in the format of type length values.

The indication may be prepared in a format of a special network access identifier in an authentication message and/or medium access control message in a network entry phase.

The information may comprise information on connections/relationships between networks.

The list may comprise identities of the networks and displayable names of the identities, and a list of available networks may be prepared from the received list and configuration information of the apparatus.

According to an aspect of the invention, an identity of a base station is received, and an identity of a network access provider network from the identity of the base station is compared with a list of identities of network service provider networks and from the comparison it is determined whether the base station is connected at least to a network service provider network an apparatus desires to connect.

The determining whether the network service provider network is a network the apparatus desires to connect may comprise determining whether an operator of the network access provider network and an operator of the network service provider network are the same.

According to an aspect of the invention, information about supported connections/relationships between networks is obtained, the information is processed, and the processed information is transmitted to an access service network.

Information about network connections/relationships supported by an apparatus may be transmitted to connectivity service networks/network service provider networks.

The information about supported connections/relationships between networks may comprise connectivity information between network service provider networks.

According to an aspect of the invention, information about supported connections/relationships between networks is obtained, the information is processed and the processed information is included into a message, and the message is transmitted.

According to an aspect of the invention, a message including information about connections/relationships between networks is received, a network is selected based on the information and an indication for connecting/entering the network selected is prepared, and the indication is transmitted.

A message requesting the information may be prepared, and the message may be transmitted to an access service network.

The present invention may be implemented as a computer program product.

For the purpose of the present invention described in the following, it should be noted that method steps likely to be implemented as software code portions and being run using a processor at one of the server/client entities are software code independent and can be specified using any known or future developed programming language;

method steps and/or devices likely to be implemented as hardware components at one of the server/client entities are hardware independent and can be implemented using any known or future developed hardware technology or any hybrids of these, such as MOS, CMOS, BiCMOS, ECL, TTL, etc, using for example ASIC components or DSP components, as an example;

generally, any method step is suitable to be implemented as software or by hardware without changing the idea of the present invention;

devices can be implemented as individual devices, but this does not exclude that they are implemented in a distributed fashion throughout the system, as long as the functionality of the device is preserved.

Furthermore, it is to be noted that in the following for simplicity reason it is referred to SS only while the description and in particular the present invention is related to any kind of mobile or fixed user equipment or mobile station MS, such as a mobile station, a mobile phone, a fixed phone, a personal computer (PC), a laptop, a personal digital assistant (PDA) or the like.

According to a first embodiment of the invention, a network providing access for a subscriber station, e.g. an ASN (Access Service Network) belonging to an NAP (Network Access Provider), receives information about which networks providing connectivity services, e.g. CSNs (Connectivity Service Networks) belonging to NSPs (Network Service Providers), have a free or a possible access at the same time the ASN/NAP receives a list of CSNs/NSPs that can be accessed by the ASN/NAP. In this application, networks that may be accessed by creating the credentials on the fly or having them on paper are called "possible networks".

With the first embodiment, searching of free WiMAX networks as well as "possible" WiMAX networks is enabled and connecting to them is made possible. When detection of free and "possible" WiMAX networks is enabled in the WiMAX network search, subscriber station is able to show them properly in a list of networks that the user may choose.

According to the prior art, use of free and "possible" networks could be enabled e.g. by using a special NAI (Network Access Identifier). However, with this solution it is not possible to recognize which networks are free and "possible" networks. Rather, the subscriber station has to try to connect to each of the networks with the special NAI and notice whether the network can be accessed freely, or by creating credentials on the fly, or not at all.

According to a second embodiment of the invention, information on R5 IF relationships of user home NSP can be derived directly or implicitly by the SS from the network over WiMAX MAC air IF by improving WiMAX 802.16 network entry and re-entry MAC level messaging and WiMAX network signaling. In other words, information are derived from visited/home NSP of possible support of R5 IF to user's home NSP by directly requesting the information or by implicitly querying a support or by network broadcast.

With the second embodiment, network entry/re-entry procedure for two different use cases is improved:
1) a roaming network entry, i.e. a connection from a subscriber station to a visited network, is improved, and
2) roaming to another network when the subscriber station is already connected, i.e. handover towards different NAP (Network Access Provider)/NSP (Network Service Provider), is improved.

According to the second embodiment, with minor additional MAC signalling overhead and/or minor extra functionality in the network, an NSP list or home NSP support can be retrieved dynamically. The subscriber station becomes aware of NSP-NSP contracts without having to store preconfigured information of R5 IF (Interface between NSPs) relationships of a home NSP. Updating of dynamical changes of NSP-NSP contracts in the subscriber station is enabled. The home NSP can push a list of its R5 IF relationships in a preferred order.

With the second embodiment, R5 IF relationships can be filtered (AAA (Authentication, Authorization and Accounting) or ASN (Access Service Network) pushes only NSP-NSP connections of requesting subscriber station) and provided in preferred order (ranking is done by home NSP/AAA). The solution according to the second embodiment includes also network side functionality and provides multiple implementation options.

According to a third embodiment of the invention, network discovery and entry can be accelerated.

According to a fourth embodiment of the invention, the network keeps track on NAP/NSP ID (Identifier) mappings into displayable names, realms and operator logos. The SS can ask this information from the network or the network can inform the SS that existing information has been updated. With the fourth embodiment, the subscriber station is enabled to show its operator logo or display the operator name or realm correctly even if the logo, name or realm changes.

The embodiments of the invention and modifications thereof can be implemented alone or in any combination thereof, which will be understood from the following description of the preferred embodiments of the invention in combination with the accompanying drawings.

DESCRIPTION OF THE PREFERRED EMBODIMENTS

Figure 1:
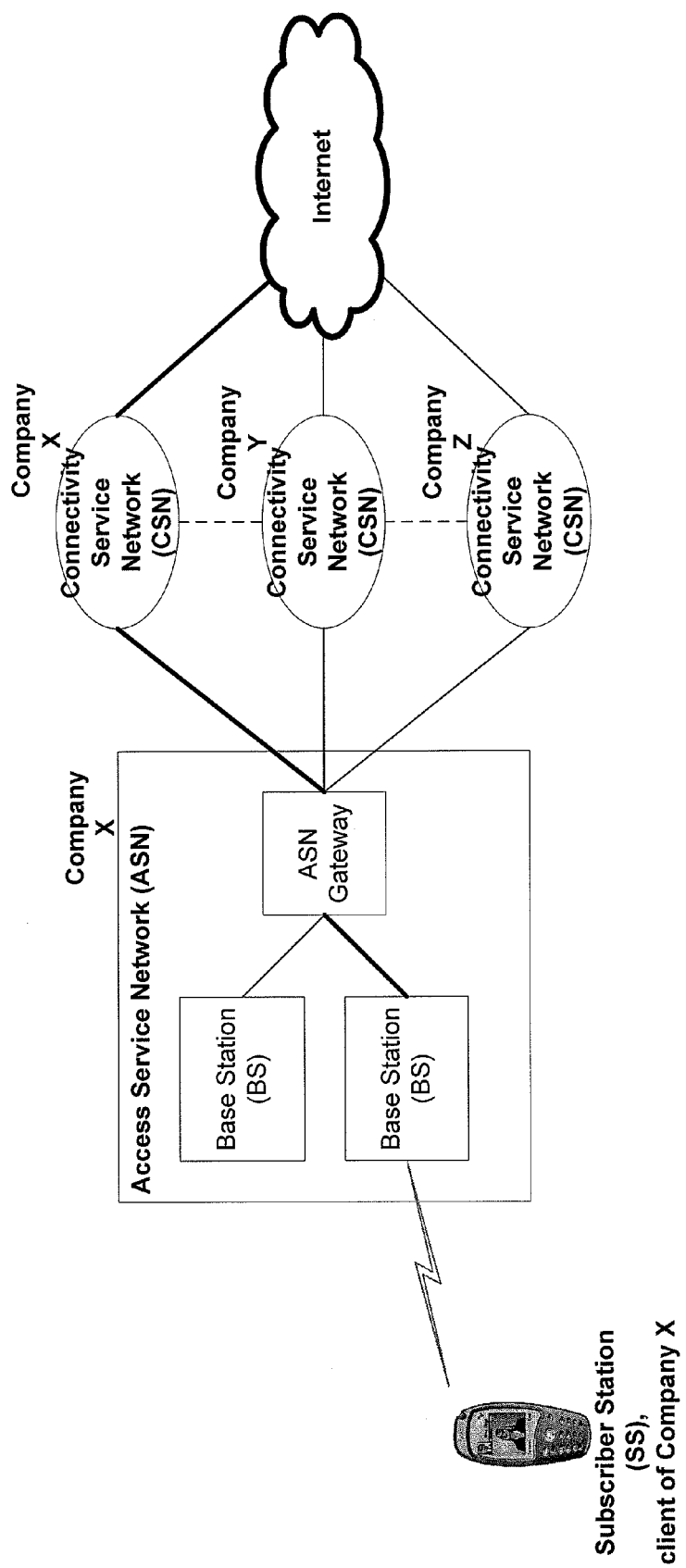
FIG. 1 shows a schematic diagram illustrating an example of a WiMAX network architecture.

FIG. 1 illustrates a simplified view of a WiMAX network architecture. The following description of the WiMAX network architecture focuses on the aspects necessary for understanding the invention.

When a subscriber station enters a network, it scans different Base Stations (BSs), which may belong to different Access Service Networks (ASNs). There may be many ASNs although not shown in FIG. 1. The subscriber station scans the different Base Stations in order to find out which ASN is connected to a desired Connectivity Service Network (CSN), typically a home network. When such BS is found, the subscriber station makes the connection, indicating in the connection process to which CSN the BS should connect to. The ASN comprises one or more base stations for connection to the subscriber station and an ASN gateway for connection to the CSNs.

ASNs may belong to different Network Access Providers (NAP) i.e. companies, CSNs may belong to different Network Service Providers (NSP) i.e. companies, and NAP and NSP may be the same or different company.

As shown in FIG. 1, Company X owns the ASN and CSN (i.e. the company is both NAP and NSP). As the SS is a client of Company X, the subscriber preferably uses Company X's CSN for the connection.

Figure 2:
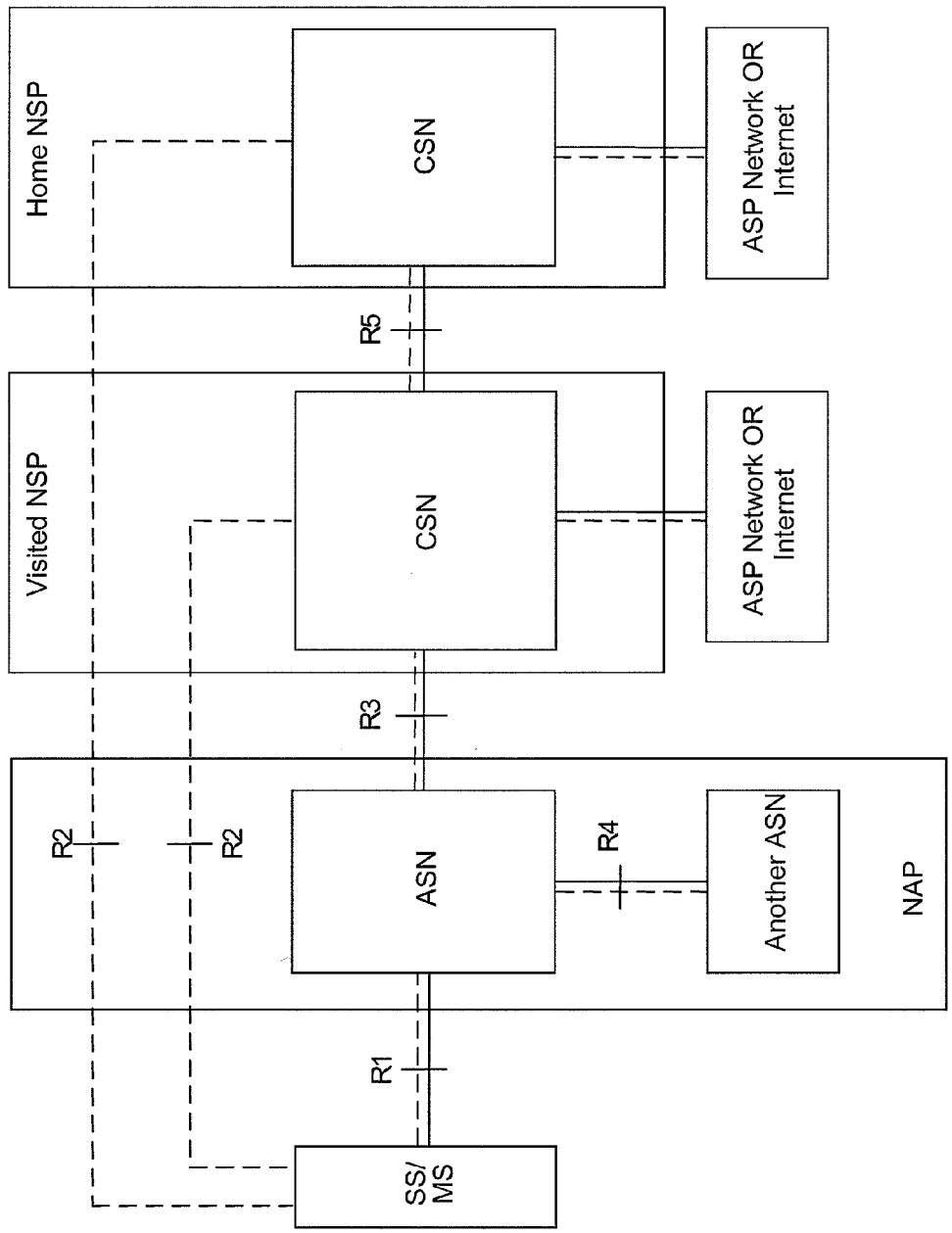
FIG. 2 shows a schematic diagram illustrating a WiMAX network reference model.

FIG. 2 shows a WiMAX Network Reference Model similar to the architecture shown in FIG. 1, further illustrating interfaces R1 to R5 between subscriber station, ASNs and CSNs. An NAP may support more than one NSP. Also, the NSP may have share or roaming relationship with one or more external NSP, i.e. interfaces R5.

Figure 3:
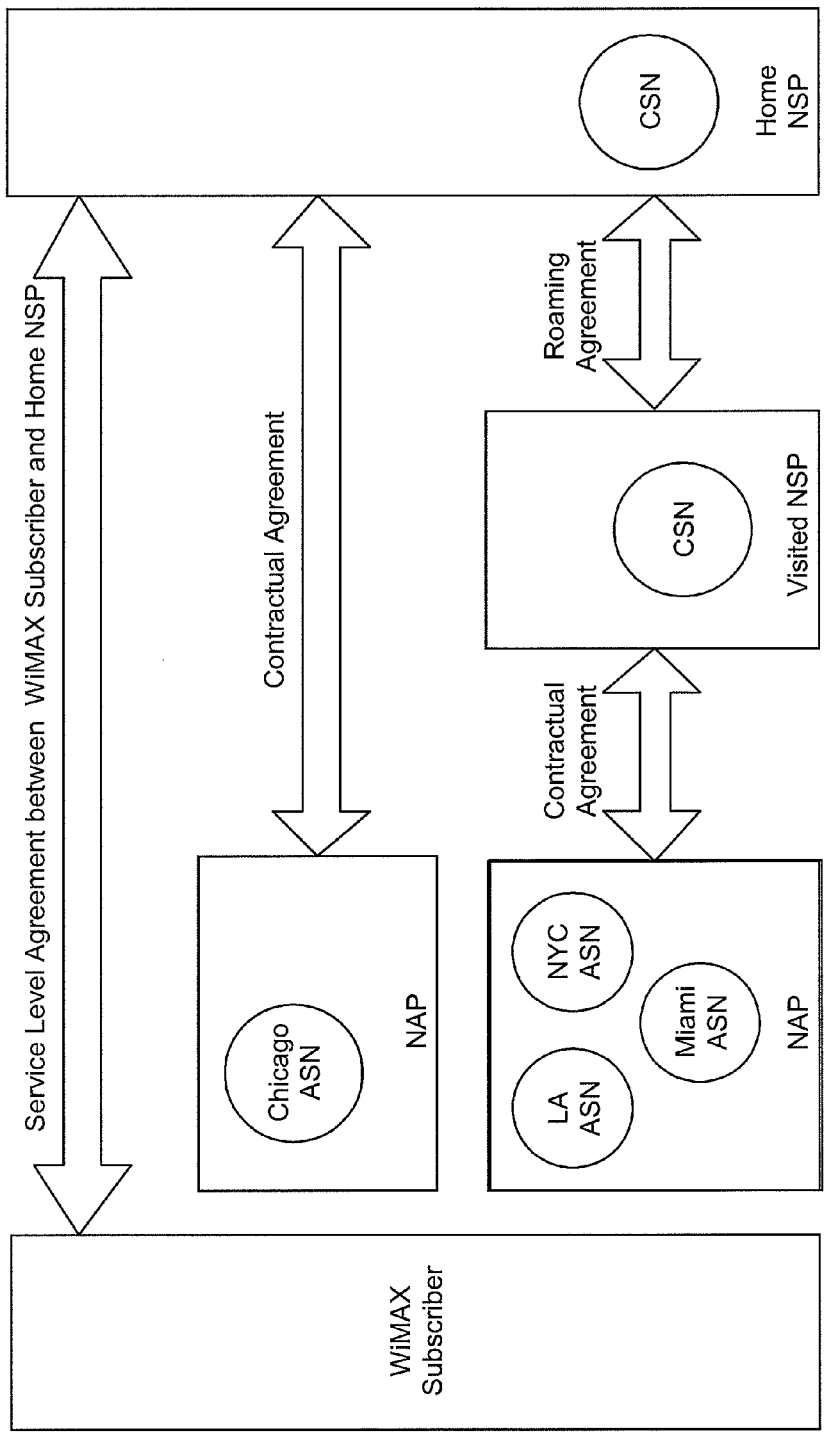
FIG. 3 shows a schematic diagram illustrating relationships between a WiMAX subscriber, NAPs and NSPs.

FIG. 3 shows relationships between WiMAX Subscriber, NAP, and NSPs. There may be a service level agreement between the WiMAX subscriber and a Home NSP which may have a contractual agreement with an NAP running an ASN 'Chicago ASN'. The Home NSP may have a roaming agreement with a Visited NSP which in turn may have a contractual agreement with an NAP running ASNs 'LA ASN', 'NYC ASN' and 'Miami ASN'.

Figure 4:
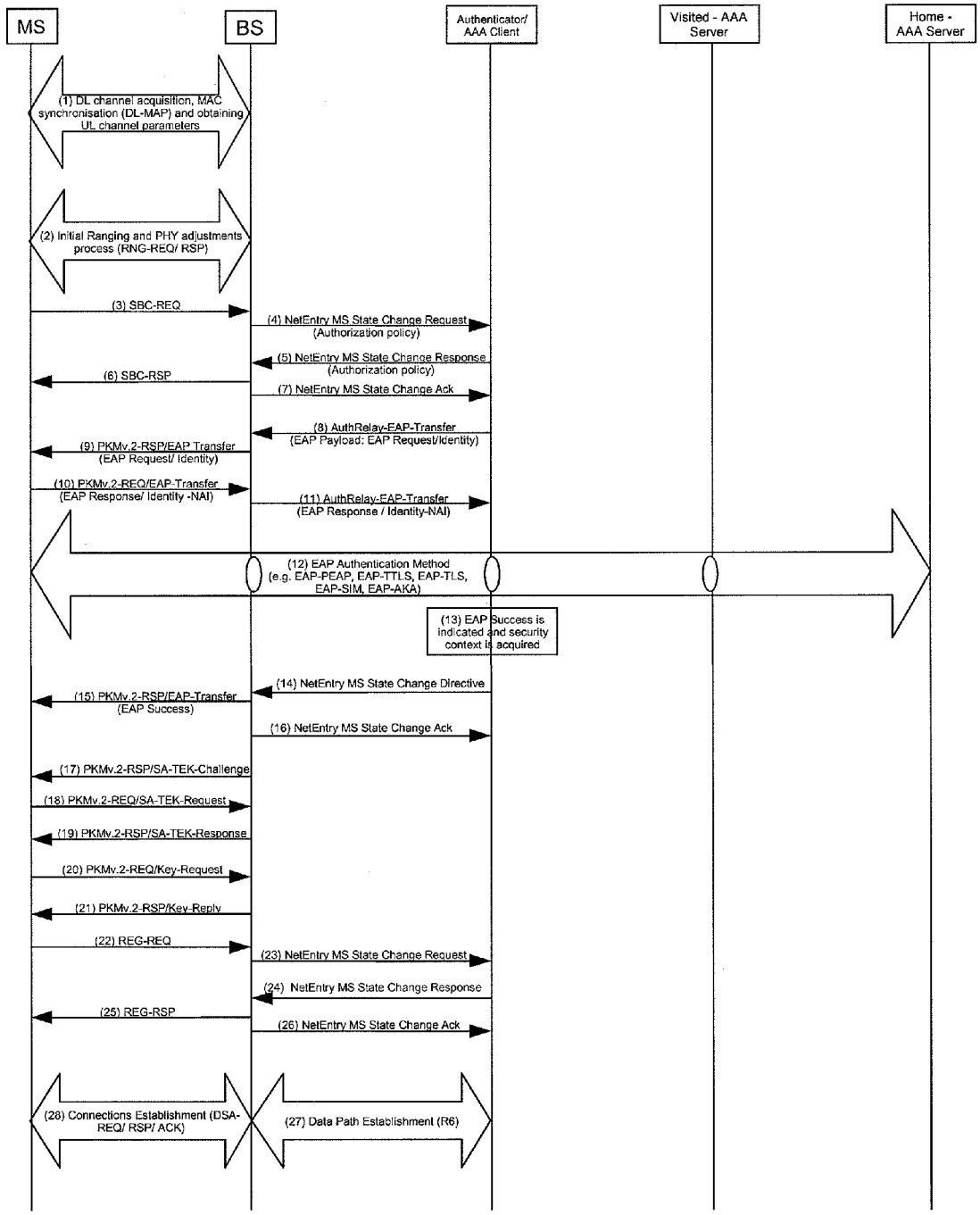
FIG. 4 shows a signaling diagram illustrating an initial network entry.

FIG. 4 shows an initial network entry performed by the mobile station or subscriber station, in which a single EAP method is used.

The SS can be notified on NAP→NSP relationships (identifier(s) of NSP(s) supported by the NAP) information by using Service Information Identity (SII-ADV) broadcast MAC management message. Also, the BS can transmit the list of NSP IDs as part of SBC-RSP (basic capability negotiation) (communication (6) in FIG. 4) in response to an SS request through SBC-REQ (communication (3) in FIG. 4).

A configuration list may be stored in SS to support roaming and automatic network selection. The requirement is to enable the SS to discover all accessible NSPs, and to indicate the NSP selection during connectivity to the ASN. The actual NSP selection mechanism employed by the SS may be based on various preference criteria, possibly depending on the presence of configuration information on the SS. Configuration information may include:
  a) information useful in SS discovery of NAP including channel, center frequency, and PHY profile,
  b) information useful in SS decision mechanism to discriminate and prioritize NSPs for service selection including a list of authorized NAP(s) and a list of authorized NSP(s) with a method of prioritization for the purpose of automatic selection,
  c) a list of authorized 'share' or 'roaming' affiliation relationships between authorized NAP(s) and NSP(s) and partner NAP(s) and NSP(s), with a method of prioritization for the purpose of automatic selection,
  d) identity/credentials provided by NSP(s) to which the SS has a business relationship, and
  e) a mapping relation table between 24-bit NSP identities and corresponding realms of the NSPs.

Time Division Duplexing (TDD) is the most popular way of distinguishing downlink and uplink traffic in mobile WiMAX. In TDD, the same frequency band is used for both ways so that the whole band is allocated for downlink traffic for a period of time and after that for uplink traffic for a period of time.

Figure 5:
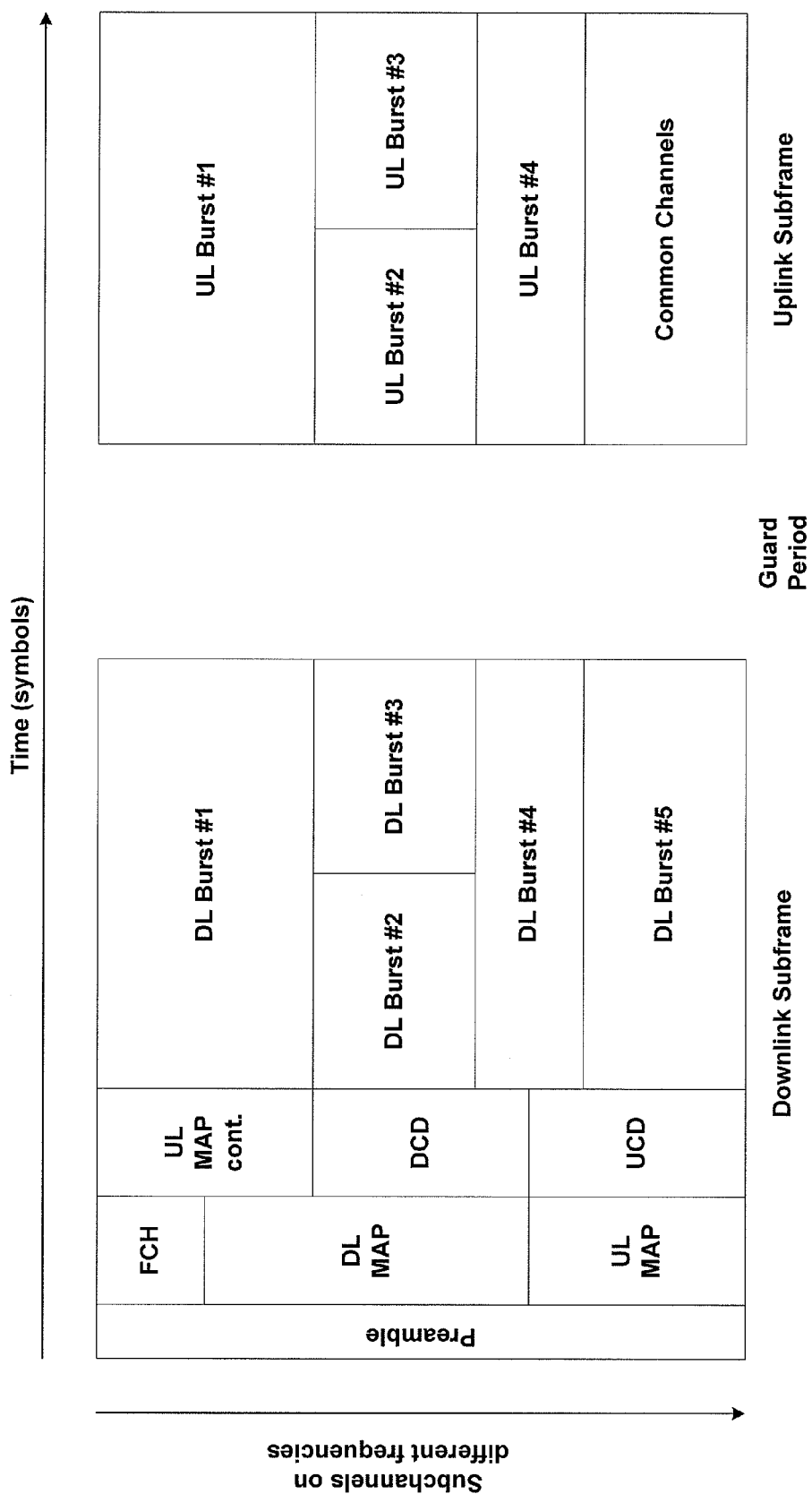
FIG. 5 shows a schematic diagram illustrating TDD downlink and uplink frames.

FIG. 5 shows an example of TDD traffic. First there is a downlink frame. It always starts with a preamble, which simply marks the start of the frame. Preamble is followed by Frame Control Header (FCH), which holds information of DL-MAP coding and length. Trailing FCH, there is DL-MAP. It holds Base Station ID information and describes the downlink frame bursts i.e. the place of the burst in the frame, to which subscriber station the burst is intended to, and what is the format of the burst in a form of Downlink Interval Usage Code (DIUC). DL-MAP is followed by UL-MAP, which indicates similar information of the upcoming uplink frame, i.e. it indicates to the subscriber stations at which point they are allowed to send.

The next in the frame is Downlink Channel Descriptor (DCD) which maps DIUC codes to physical parameters such as modulation, coding and forward error correction (FEC). Without DCD, the SS is only able to decode bursts sent with DIUC code 0 (i.e. only DCD can be sent with DIUC code 0). The base stations broadcast DCD periodically, at least once every 10 seconds. In other words, DCD is present in the DL frame only occasionally. Uplink Channel Descriptor (UCD) similarly maps Uplink Interval Usage Codes (UIUC) to physical parameters used in the uplink frame. Without UCD, the SS is unable to send data to uplink or at least has a very limited capacity to do so. UCD is broadcasted periodically by the base station, at least once every 10 seconds.

The phases of the network entry comprise:
  1. The SS scans frequencies until a preamble is found, i.e. a frame stream is found.
  2. From DL-MAP the SS gets the unique 48-bit base station ID. Most significant 24 bits of the base station ID indicate the Network Access Provider ID (NAP ID, i.e. the company to which the base station belongs to). $25^{th}$ bit in the base station ID is an NSP identifier flag. If it is set to '0', this means that the ASN is only connected to one NSP, and in this case the NAP and NSP are the same company, i.e. the NAP ID is also the NSP ID. If the NSP identifier flag is set to '1', the subscriber station has to carry out NSP access discovery, i.e. finding out to which NSPs the ASN is connected to. There are couple of options for this:
      If the subscriber station happens to have a record indicating to which NSPs the discovered NAP is connected to, the subscriber station can use that information;
      If the base station happens to broadcast SII-ADV (Service Identity Information Advertisement) message holding a list of connected NSPs, the subscriber station can obtain desired information from the list. Broadcasting this message, however, is optional. In addition, DCD may be required to decode SII-ADV;
      The subscriber station continues entry (see following steps).
  3. The subscriber station waits for the base station to broadcast DCD (before DCD is received, the subscriber station is only able to decode messages with DIUC code 0).
  4. Once DCD is known, the subscriber station is able to decode all the bursts from the DL frames.
  5. The subscriber station carries out ranging, i.e. determining power level and timing adjustments for transmission.
  6. The subscriber station carries out capability negotiations with the base station. The subscriber station gets information of NSPs connected to the base station. Note that in case BS supports SII-ADV and has sent it, the subscriber station may already have this knowledge.
  7. The next phase is authentication. At the same time with the authentication, the subscriber station indicates to which NSP it wants to connect to.
  8. Next phases are registration, achieving IP connectivity and creating service flows.

First Embodiment

As described above, WiMAX network search provides information, e.g. a list about the available networks. According to this list, the subscriber station (SS) is able to show to the user the networks that it can access with the credentials stored into the subscriber station. However, network search does not provide information whether the network can be used freely or not. Moreover, network search does not enable detection of the networks that may be accessed by creating the credentials on the fly or having them on paper (here these networks are called "possible networks"), rather than having them preconfigured into the SS. Credentials may be created on the fly, for example, by using limited access into a web portal which only enables creation of the credentials.

In addition, it is not possible to connect into a free WiMAX network. Furthermore, connecting to the "possible networks" is not enabled either.

According to a first embodiment of the invention, searching of free WiMAX networks as well as possible networks is enabled and connecting to them is made possible. An example use case could be that some city wants to provide a free WiMAX network for its citizens.

There are a few implementation alternatives for both phases, that is, searching free and possible WiMAX networks and entering into a free or a possible WiMAX network.

Searching Free and Possible WiMAX Networks:

Information about whether a network can be accessed freely or by creating the credentials on the fly may be indicated during the search according to the following alternatives:

SII-ADV: The network (ASN) includes a list of free and possible networks into the SII-ADV message as a new TLV (Type Length Value) or this information is included in some already existing TLV.

SBC-RSP: Similarly to SII-ADV, the network (ASN) sends a list of free and possible networks (as a new TLV or included in some already existing one) when requested by the SS with SBC-REQ. For example, two bits of SIQ (Service Information Query) TLV may be used for indicating whether the network is a free or possible network.

Some other/new MAC message: The network (ASN) sends a list of free and possible networks in some other/new MAC message.

Device management: The network may preconfigure the subscriber station with the information about which NSPs have free or possible access by means of device management. Then, during the search, the subscriber station may check found NSPs with the preconfigured list.

The NAP may receive information about which NSPs have a free or a possible access at the same time it receives the list of NSPs that can be accessed from the NAP.

According to the first embodiment, a network (e.g. an ASN) providing access for a subscriber station may comprise a receiving device (e.g. an ASN gateway) for receiving the information about free and possible networks, a processing device for processing the information and a transmitting device (e.g. a base station) for transmitted the processed information to a subscriber station. Processing the information may comprise preparing the list of free and possible networks and including the list in at least one of the above-described messages.

Entering into a Free or a Possible WiMAX Network:

Entry to a free or possible WiMAX network can be performed according to the following alternatives:

Special NAI: A special NAI (Network Access Identifier) in authentication (authentication is shown in FIG. 4 in communications from (8) to (21) and NAI is transferred in communications (10) and (11)) indicates that a free or a possible network is to be entered. This includes three alternatives (reserved part of the NAI is indicated in italics in the examples described below) which can be supported by the networks:

Reserved realm: Reserved realm, for example, anonymous@*freenetwork.org* or anonymous@*possiblenetwork.org* is used to indicate that SS wants to connect to any free or possible network, respectively. Then, the network may choose which one to use if there is more than one free or possible network available.

Reserved username with network's realm: Reserved username together with the realm of the selected network, for example, *anonymous*@selected.network.com or *possible*@selected.network.com indicates that SS wants to connect to a free or a possible network, respectively, which has selected.network.com as its realm.

Reserved decoration: Reserved decoration, for example, *anonymous!*username@selected.network.com or *possible!*username@selected.network.com indicates that SS wants to connect to a selected free or possible WiMAX network (selected.network.com in the example), respectively, with a given username.

Another alternative of entering a free or possible WiMAX network is the use of a MAC message: SS indicates the NSP ID of the free or possible network with some existing (RNG-REQ, SBC-REQ or REG-REQ) or new MAC message in a phase of the network entry.

According to the first embodiment, the subscriber station may comprise a receiving device for receiving the list of free and possible networks from the access service network, a processing device for checking found networks based on pre-configured information on free and possible networks, processing information included in the list, and preparing at least one of the above indications for connecting/entering a free or possible network based on the information, and a transmitting device for transmitting the indication to the access service network.

Second Embodiment

As described above, a configuration list of R5 IF relationships of home NSP may be stored in SS. A static preconfigured list is suboptimal for limited resources of SS. And on the other hand this list may change when the home NSP is subject to new roaming contracts, and then also the list in SS has to be changed.

A second embodiment of the invention improves providing the SS with information on R5 IF relationships of the home NSP of the user directly or implicitly from the network to the SS over WiMAX MAC air IF.

WiMAX network entry and re-entry MAC level messaging and WiMAX network signaling as shown in FIG. 4 is improved to get information from visited/home NSP of possible support of R5 IF to user's home NSP by directly requesting the list or by implicitly querying the support or by network broadcast.

SS may request NSP-NSP connectivity information from the BS (NAP/ASN/NSP/CSN) with:
RNG-REQ/RSP messages (initial ranging (shown in communications (2) in FIG. 4)), or
SBC-REQ/RSP messages (basic capabilities (shown in communications (3) and (6) in FIG. 4)), or
some other or maybe new MAC message pair for deriving NSP-NSP connectivity information.

The following steps will be carried out when SS requests NSP-NSP connectivity information (x-REQ/x-RSP means the alternatives above):
SS sends x-REQ to BS with its home NSP identifier included to the message as a new TLV. This request may be specified in two different ways (or both of the ways may be supported by indicating in the request which way to use):
1) implicit query: "is given NSP supported by network", i.e. "is given NSP supported directly within this NAP, via R5 IF or not at all?", and/or
2) direct request: "provide a list of NSPs (in preferred order) having roaming agreement with given home NSP from the NAP/ASN/BS".
BS/ASN/ASN GW/dedicated server in ASN queries this information from attached NSPs. This may be done by broadcasting the request to the attached NSPs, or by unicasting one by one to each of the attached NSPs. There are two aspects depending on the used way:
1) implicit query: NAP requests this information from the attached NSPs.
2) direct request: NAP requests this information from the home NSP possibly through visited NSPs. Because NAP and home NSP may support NSPs that the other party does not support, a subset of this information may have to be taken to accomplish a list of NSPs supported by NAP and having roaming agreement with home NSP. Firstly, subset can be accomplished by home NSP if NAP has sent information on NSPs that it supports to the home NSP. Secondly, NAP may take the subset if home NSP returns information on all NSPs that it has roaming agreement with.

BS/ASN/ASN GW/dedicated server collects the responses of the above query.

BS sends x-RSP to SS with a new TLV. The content depends on the meaning of the request:

1) implicit query: content indicates whether "home NSP is supported directly" or "home NSP is supported via R5 IF (roaming) through returned visited NSP" or "home NSP is not supported at all";

2) direct request: Content includes a list (in preferred order) of NSPs having roaming agreement with home NSP.

The following improvements may be used to ease handovers in environments where NSP change occurs at the same time with inter NAP handover:

When SS requests neighbor information from the serving BS with MOB_SCN-REQ/RSP, serving BS indicates to which NSPs the SS can be connected from neighbors, or if it is possible to connect from neighbors to an NSP;

When serving BS sends MOB_NBR-ADV (or some new MAC broadcast message), NSPs supported by the BSs/NAPs are included in the message as, for example, NSP List TLV.

TLV encoded fields may be used for the changed/added information in different messages.

The home AAA/NSP may maintain a list of all roaming contracts (possibly in preferred order) and visited NSPs can request this information. Also, NAP may request this information from the visited NSPs.

According to the second embodiment, a network providing connectivity service (e.g. a CSN/NSP) may comprise a receiving device for receiving information about supported NSP-NSP connections, a processing device for processing the information and a transmitting device for transmitting the processed information to an access service network. The transmitting device of the CSN/NSP may also transmit information about NSP-NSP connections of the CSN/NSP to other CSNs/NSPs.

The receiving unit of the access service network (e.g. ASN) may receive the information about the NSP-NSP connections, the processing unit of the ASN may process the information and include the processed information in at least one of the messages as described above and the transmitting unit may transmit the message to the subscriber station.

The processing unit of the subscriber station may generate a request for the information on the NSP-NSP connections and include the request in at least one of the messages as described above and the transmitting device may transmit the message. The receiving device of the subscriber station may receive the message transmitted from the transmitting unit (e.g. the BS) of the access service network, which includes the processed information about the NSP-NSP connections.

The information about the NSP-NSP connections can be combined with the information on free and possible networks according to the first embodiment.

Third Embodiment

In case Base Stations of a certain NAP are connected to many NSPs (i.e. the NSP identifier flag in the Base Station ID is set to '1'), discovering the NSPs may take a relatively long time in case the SS does not have information of the NAP-NSP relationship stored. Alone waiting for DCD for a single base station may take up to 10 seconds or even more in case DCD happens to get corrupted beyond repair.

In case the NAP and NSP happen to be the same company, the SS can deduce one connected NSP by simply trying to find NAP ID from its stored NSP ID list (at very least the home NSP is known). If a match is found, the SS can be sure that the Base Station is connected to at least that NSP. If the NSP happens to be the desired one, the SS can continue connecting to the network, with the knowledge that the Base Station can provide connection to the desired CSN.

Setting NSP identifier flag to '0' in BS ID means that NAP ID is also NSP ID and that NSP is the only one connected to the BS. In order to achieve uniqueness of both identifiers, NAP IDs and NSP IDs are allocated from the same pool.

According to the third embodiment, even if NSP identifier flag is set to '1' (e.g. due to the fact that BS is connected to many NSPs), the NAP ID from BS ID is compared against a list of known NSP IDs by the SS in order to find out whether NAP and NSP operators happen to be the same and hence it can be deduced that the BS is connected at least to the NSP in question.

According to the third embodiment, the processing unit of the SS may perform the above-described procedure of comparing the IDs.

Fourth Embodiment

Mapping of NSP ID to realm (e.g. sonera.com), that is the address of the home AAA, is known. According to a fourth embodiment of the invention, NSP ID is mapped into displayable network/operator name (e.g. Sonera) that can be displayed on the subscriber station's display. NAP ID may be also mapped to displayable name and realm. Furthermore, if realm is unknown to the SS, NSP ID can be used in NAI instead of realm to indicate the network service provider to connect to.

According to WiMAX solution described below, the network keeps track on NAP/NSP ID mappings into displayable names, realms and operator logos. The SS can retrieve this information from the network or the network can inform the SS that existing information has been updated. An alternative solution is to expand NITZ (Network Identifier and Time Zone) specified by 3GPP for GSM networks for network identifier to WiMAX networks. A second alternative solution is to use DNS (Domain Name Server) to make needed mapping using L3 layer.

WiMAX Solution:

Subscriber Station (SS) Functionality:

SS is enabled to ask mapping of NSP/NAP ID to realm, display name and operator logo from the network with an added MAC message or by using an existing MAC message (for example, SBC-REQ) with new TLV. It is possible to ask multiple mappings at the same time since the new TLV contains NAP/NSP IDs for which the realm, operator name and/or operator logo are requested. The network (ASN) answers with an old MAC message (for example, SBC-RSP) or a new MAC message with new TLV which comprises:

NSP/NAP ID
Number of NSP/NAP IDs
Display name
Character set, default is UTF8
Realm of the NAP/NSP IDs
Operator logo
   Logo as a binary data
   URL (Uniform Resource Locator) to the location of operator logo A basic or primary management connection can be used to send the MAC messages between the BS and the SS.

The network (ASN) can also send updated information to the SS using SII-ADV, SBC-RSP, an added MAC message or an existing MAC message. This message may contain only updated information and NAP/NSP ID to reduce traffic between SS and BS.

A User Interface may be configured such that selection is possible as to whether display name, operator logo or nothing is displayed on a display of the SS.

If the SS lacks realm information and is unable to obtain it, NSP ID may be used in NAI during authentication instead of realm. For example, NAI 12345!user@home.network.com would indicate that the "user" would like to connect to its home network "home.network.com" (which could be also indicated by NSP ID instead of realm) by roaming through NSP having identifier "12345".

The SS may have hard coded NAP/NSP ID and display name mappings. If SS receives information from the network that differs from the hard coded information, the SS must use this new information and store it to a non-volatile memory for further usage. Preferably, storing is performed such that user defined mappings are not overwritten.

Figure 6:
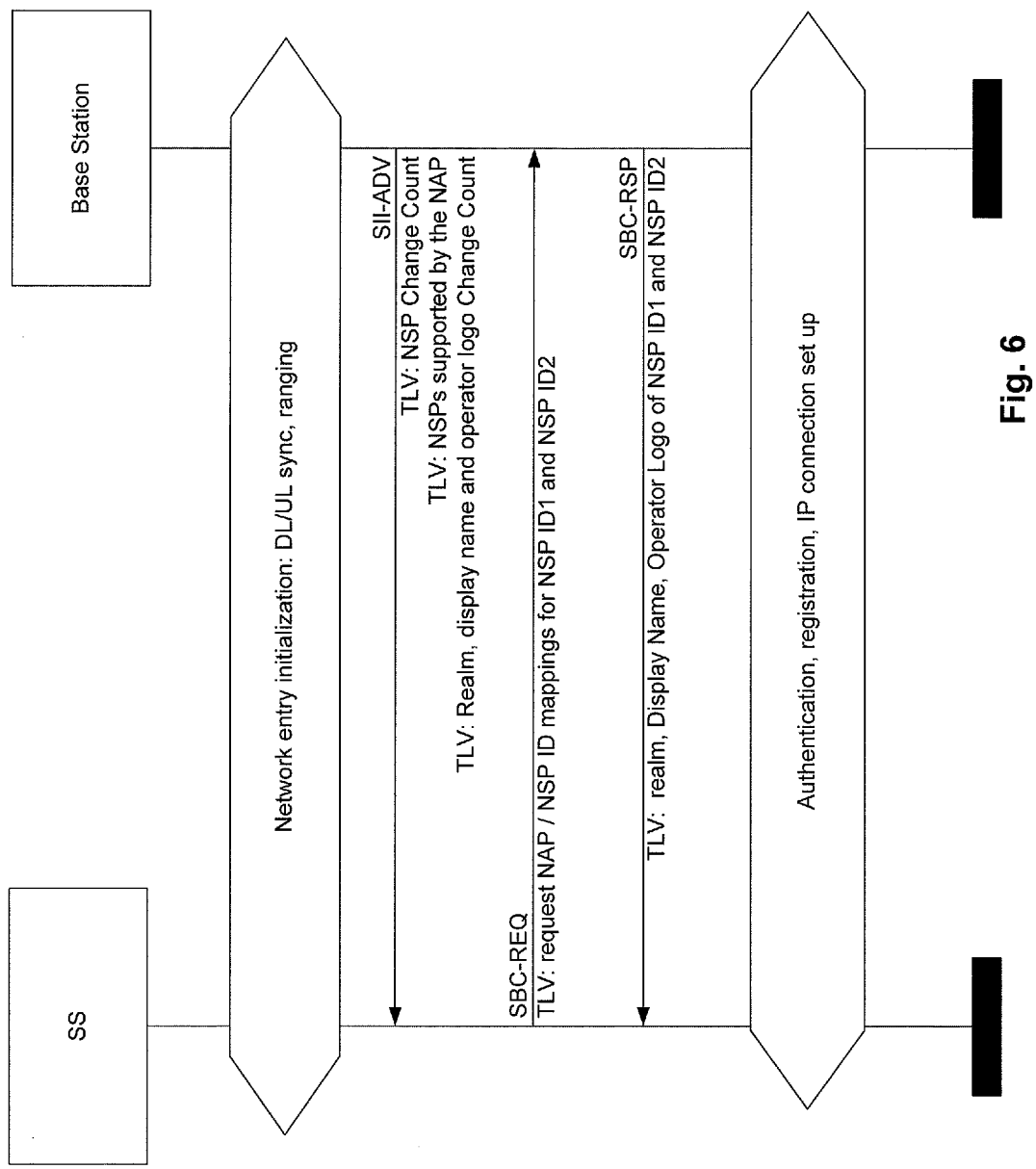
FIG. 6 shows a signaling diagram illustrating a situation in which a subscriber station asks NAP/NSP ID mappings to realms, display names and operator logos from a network in a network entry phase when supported NSPs of NAP are known according to a fourth embodiment of the invention.

FIG. 6 shows a situation in which the SS asks NAP/NSP ID mappings from the network in the network entry phase when supported NSPs of NAP are known prior to sending SBC-REQ due to SII-ADV. SII-ADV contains a new TLV to indicate that realm, display name or operator logo of one of the NAPs/NSPs has changed. With a MAC message SBC-REQ including a TLV to request NAP/NSP ID mapping (which may be generated by the processing device of the SS), which is sent to the Base Station (e.g. by the transmitting device of the SS), the SS requests NAP/NSP ID mappings from the network. The network answers with a SBC-RSP message including a TLV containing realm, Display Name, Operator Logo (which may be generated by the processing device of the access service network), which is sent from the Base Station to the SS, and received by the receiving device of the SS.

Figure 7:
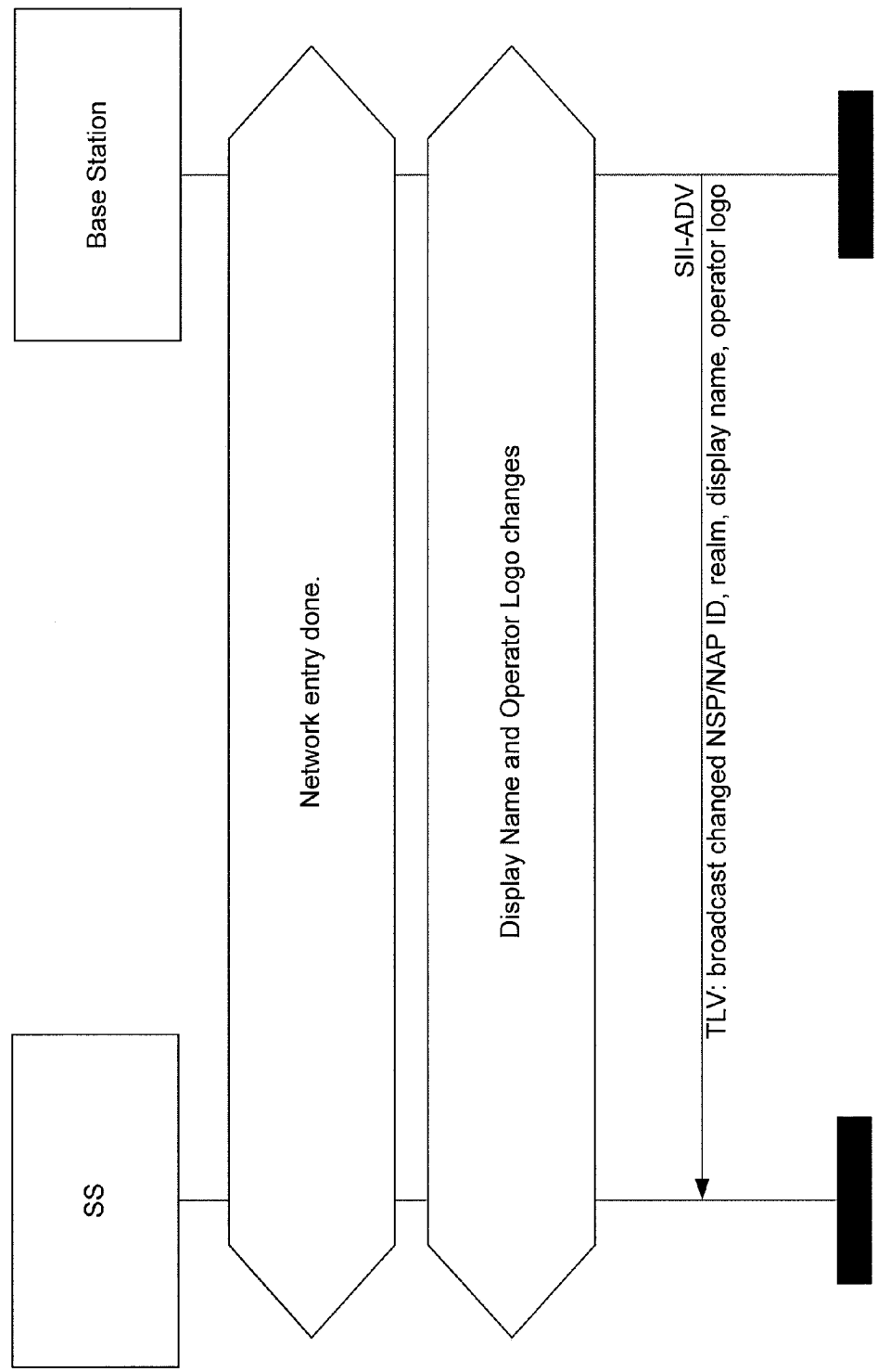
FIG. 7 shows a signaling diagram illustrating a procedure of informing about a change according to the fourth embodiment of the invention.

FIG. 7 shows a situation in which the network informs the SS when the existing information is changed. As shown in FIG. 7, when network entry is completed and display name and operator logo changes, the base station sends a message SII-ADV including a TLV containing NSP/NAP ID, realm, display name and operator logo to the SS. The message SII-ADV may be generated by the processing device of the access service network and received by the receiving device of the SS.

Figure 8:
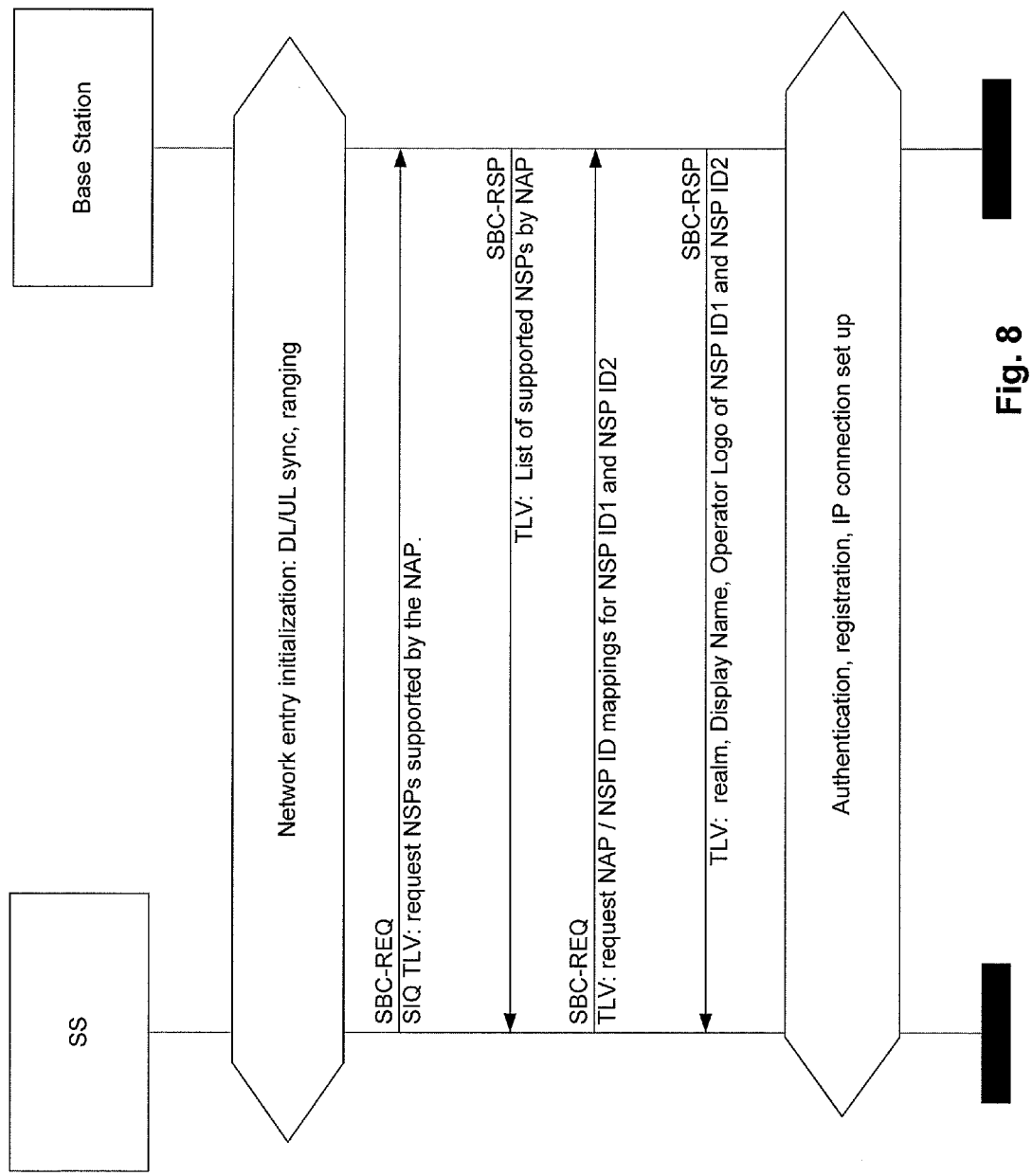
FIG. 8 shows a signaling diagram illustrating a situation in which the subscriber station asks NAP/NSP ID mappings to realms, display names and operator logos from the network in the network entry phase when supported NSPs of NAP are unknown according to the fourth embodiment of the invention.

FIG. 8 shows a situation in which the SS asks NAP/NSP ID mappings from the network in the network entry phase when supported NSPs of NAP are unknown prior to sending SBC-REQ (SII-ADV not received). SS first sends an SBC-REQ to request list of supported NSPs by NAP. Then, with the second SBC-REQ message including a TLV to request NAP/NSP ID mapping (which may be generated by the processing device of the SS), which is sent to the Base Station (e.g. by the transmitting device of the SS), the SS requests NAP/NSP ID mappings from the network. The network answers with an SBC-RSP message including a TLV containing realm, Display Name, Operator Logo (which may be generated by the processing device of the access service network), which is sent from the Base Station to the SS, and received by the receiving device of the SS.

Network Functionality:

The above features are included in WiMAX network by providing needed functions and interfaces between these functions. Implementation may be done by using DNS scheme. New functions may be located to the CSNs or ASNs. For this purpose, CSN must have connections to all NSPs (CSNs) and NAPs (ASNs) with which the NSP has an SLA (Service Level Agreement). These connections are used to transfer mapping information. Thus, the receiving device of the connectivity service network may receive the mapping information from all CSNs and ASNs with which the NSP has an SLA.

NITZ Solution (Alternative):

All needed functions specified by NITZ can be integrated to WiMAX network and updated to NITZ specifications to support NAP/NSP ID mapping (display name, realm, operator logo, etc.). Another implementation solution is NITZ inter-working, i.e. 3GPP and WiMAX inter-working.

DNS Solution (Alternative):

SS requests realm to display name mappings from DNS server used commonly in IP world to map IP addresses to host names. The display name information is stored into the text part of DNS information structure. Same DNS server may then be used for normal DNS operations and realm/display name mappings. The DNS server may be extended to support also NAP/NSP ID mappings.

Providing the information from the network to the SS according to the fourth embodiment can be combined with providing the information about the NSP-NSP connections according to the second embodiment and the information on free and possible networks according to the first embodiment e.g. using the message SII-ADV with respective TLVs.

It is to be understood that the above description is illustrative of the invention and is not to be construed as limiting the invention. Various modifications and applications may occur to those skilled in the art without departing from the true spirit and scope of the invention.

The invention claimed is:

1. An apparatus comprising:
at least one processor; and
at least one memory including computer program code, the at least one processor, the at least one memory, and the computer program code configured to cause the apparatus to at least:
obtain displayable names corresponding to identities of networks which provide service for subscriber stations;
process the identities of the networks and the corresponding displayable names into processed information, wherein the identities of the networks include network service provider identifiers, and wherein the displayable names include one or more of verbose network service provider names and network service provider realms;
prepare network information for at least one network, the network information comprising one or more of a realm of the identities and an indication that the network information has been updated as the processed information; and
transmit the processed information.

2. The apparatus of claim 1, wherein the apparatus is further configured to map the identities to the displayable names.

3. The apparatus of claim 1, wherein the network information further comprises one or more of a character set and an operator logo.

4. The apparatus of claim 1, wherein the apparatus is further configured to transmit the processed information in at least one of a downlink channel descriptor message, a service identity information advertisement message, and a basic capability response message.

5. The apparatus of claim 1, wherein the apparatus is further configured to transmit the processed information to a subscriber station upon receipt of a request message from the subscriber station requesting the processed information.

6. The apparatus of claim 1, wherein the apparatus is further configured to transmit the processed information to a subscriber station upon a change of the processed information.

7. The apparatus of claim 1, wherein the processed information indicates a manner of accessing the networks, and
wherein the manner of accessing the network is free or requires subsequent creation of credentials.

8. The apparatus of claim 1, wherein the transmitted processed information further includes network access point identifiers which provide service for subscriber stations configured in accordance with WiMAX.

9. An apparatus, comprising:
at least one processor; and
at least one memory including computer program code, the at least one processor, the at least one memory, and the computer program code configured to cause the apparatus to at least:
receive information from another apparatus, the information comprising a list of identities of networks which provide service for subscriber stations and displayable names of the identities of the networks, and the information further comprising one or more of a realm of the identities and an indication that the information has been updated, wherein the identities of the networks include network service provider identifiers, and wherein the displayable names include one or more of verbose network service provider names and network service provider realms; and
select a network out of the networks based on the list.

10. The apparatus of claim 9, wherein the information further comprises one or more of a character set and an operator logo.

11. The apparatus of claim 9,
wherein the apparatus is further configured to prepare an indication for connecting/entering the network selected and transmit the indication.

12. The apparatus of claim 9, wherein the apparatus is further configured to prepare a message requesting the information and transmit the message to the other apparatus.

13. A method, comprising:
obtaining displayable names corresponding to identities of networks which provide service for subscriber stations;
processing the identities of the networks and the corresponding displayable names into processed information, wherein the identities of the networks include network service provider identifiers, and wherein the displayable names include one or more of verbose network service provider names and network service provider realms;
preparing network information for at least one network, the network information comprising one or more of a realm of the identities and an indication that the network information has been updated as the processed information; and
transmitting the processed information.

14. The method of claim 13, wherein the obtaining comprises mapping the identities to the displayable names.

15. The method of claim 13, wherein the network information further comprises one or more of a character set and an operator logo.

16. The method of claim 13, comprising:
transmitting the processed information in at least one of a downlink channel descriptor message, a service identity information advertisement message, and a basic capability response message.

17. The method of claim 13, comprising:
transmitting the processed information to a subscriber station upon receipt of a request message from the subscriber station requesting the processed information.

18. The method of claim 13, comprising:
transmitting the processed information to a subscriber station upon a change of the processed information.

19. A method, comprising:
receiving information from an apparatus, the information comprising a list of identities of networks which provide service for subscriber stations and displayable names of the identities of the networks, and the information further comprising one or more of a realm of the identities and an indication that the information has been updated, wherein the identities of the networks include network service provider identifiers, and wherein the displayable names include one or more of verbose network service provider names and network service provider realms; and
selecting a network out of the networks based on the list.

20. The method of claim 19, wherein the information further comprises one or more of a character set and an operator logo.

21. The method of claim 19, comprising:
preparing an indication for connecting/entering the network selected; and
transmitting the indication.

22. The method of claim 19, comprising:
preparing a message requesting the information; and
transmitting the message to the apparatus.

23. A computer program product comprising a non-transitory computer-readable medium encoded with instructions that, when executed by at least one processor, perform at least the following:
obtaining displayable names corresponding to identities of networks which provide service for subscriber stations;
processing the identities of the networks and the corresponding displayable names into processed information, wherein the identities of the networks include network service provider identifiers, and wherein the displayable names include one or more of verbose network service provider names and network service provider realms;
preparing network information for at least one network, the network information comprising one or more of a realm of the identities and an indication that the network information has been updated as the processed information; and transmitting the processed information.

24. A computer program product comprising a non-transitory computer-readable medium encoded with instructions that, when executed by at least one processor, perform at least the following:

receiving information from an apparatus, the information comprising a list of identities of networks which provide service for subscriber stations and displayable names of the identities of the networks, and the information further comprising one or more of a realm of the identities and an indication that the information has been updated, wherein the identities of the networks include network service provider identifiers, and wherein the displayable names include one or more of verbose network service provider names and network service provider realms; and selecting a network out of the networks based on the list.

* * * * *